(12) United States Patent
Mejia Cobo

(10) Patent No.: US 10,977,306 B2
(45) Date of Patent: Apr. 13, 2021

(54) SYSTEMS AND METHODS OF PLAYING MEDIA FILES

(71) Applicant: Marcelo Alonso Mejia Cobo, Redmond, WA (US)

(72) Inventor: Marcelo Alonso Mejia Cobo, Redmond, WA (US)

( * ) Notice: Subject to any disclaimer, the term of this patent is extended or adjusted under 35 U.S.C. 154(b) by 3 days.

(21) Appl. No.: 16/244,968

(22) Filed: Jan. 10, 2019

(65) Prior Publication Data
US 2020/0226177 A1    Jul. 16, 2020

(51) Int. Cl.
*G06F 16/683* (2019.01)
*G06F 16/638* (2019.01)
*G06F 16/64* (2019.01)
*G06F 16/68* (2019.01)

(52) U.S. Cl.
CPC .......... *G06F 16/683* (2019.01); *G06F 16/639* (2019.01); *G06F 16/64* (2019.01); *G06F 16/686* (2019.01)

(58) Field of Classification Search
CPC .... G06F 16/683; G06F 16/686; G06F 16/639; G06F 16/64; G06F 3/048; G06F 3/0488; G06F 3/0484; G06F 16/60; G06F 16/61; G06F 16/63; G06F 16/632; G06F 16/635; G06F 16/637; G06F 16/638; G06F 16/65; G06F 16/68; G06F 16/70; G06F 16/71; G06F 16/73; G06F 16/732; G06F 16/735; G06F 16/738; G06F 16/74; G06F 16/75; G06F 16/78; G06F 16/783; G06F 16/7834; G06F 16/7867; G06F 16/40; G06F 16/41; G06F 16/43; G06F 16/432; G06F 16/433; G06F 16/435; G06F 16/437; G06F 16/438; G06F 16/4387; G06F 16/44; G06F 16/45; G06F 16/48; H04N 21/4825; H04N 21/26258
See application file for complete search history.

(56) References Cited

U.S. PATENT DOCUMENTS

| | | | |
|---|---|---|---|
| 2003/0135513 A1* | 7/2003 | Quinn | G06Q 30/02 |
| 2003/0236582 A1* | 12/2003 | Zamir | G11B 27/002 |
| | | | 700/94 |
| 2004/0002310 A1* | 1/2004 | Herley | G11B 27/105 |
| | | | 455/179.1 |
| 2006/0212478 A1* | 9/2006 | Plastina | G11B 27/105 |
| 2006/0253207 A1* | 11/2006 | Jaffray | G06F 16/68 |
| | | | 700/94 |
| 2007/0038672 A1* | 2/2007 | Plastina | G06F 16/433 |
| 2009/0158155 A1* | 6/2009 | Quinn | G06O 30/02 |
| | | | 715/716 |
| 2011/0129201 A1* | 6/2011 | McLean | H04N 21/8456 |
| | | | 386/296 |

(Continued)

OTHER PUBLICATIONS

International Search Report and Written Opinion for PCT/US2020/0013124; dated Apr. 16, 2020, 7 pages.

*Primary Examiner* — Andrew C Flanders
(74) *Attorney, Agent, or Firm* — Ray Quinney & Nebeker P.C.; John O. Carpenter

(57) ABSTRACT

A method of playing media files includes accessing a media library, identifying a plurality of media files in the media library, indexing metadata of the plurality of media files, targeting a first subset of media files in the plurality of media files based on metadata of a selected media file, and playing at least one media file of the first subset of media files.

20 Claims, 9 Drawing Sheets

(56) References Cited

U.S. PATENT DOCUMENTS

2011/0161409 A1    6/2011  Nair et al.
2015/0220223 A1*   8/2015  Michalski ............. G06F 3/0482
                                                          715/716
2015/0288769 A1   10/2015  Rottler et al.

* cited by examiner

SYSTEMS AND METHODS OF PLAYING MEDIA FILES

BACKGROUND

Background and Relevant Art

Media files are conventionally played from a media library using an existing playlist, channel, or other predetermined subset of the media library. A user can select media files from the media library and build a queue of media files. Media libraries can contain hundreds, thousands, tens of thousands, or millions of media files. In some examples, the media library may be a remotely accessible media library, such as a remotely accessible cloud-based media library or other media library accessible by the electronic device from a remote location. In such instances, identifying media files similar to a selected and/or currently playing media file can present a challenge.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some embodiments, an electronic device for the playback of media includes an input device, a processor, and a hardware storage device. The hardware storage device has instructions stored thereon that, when executed by the processor, cause the processor to access a media library, access metadata of a plurality of media files in the media library, identify metadata of a selected media file, and target a subset of the plurality of media files having metadata matching or within a threshold value of the metadata of the selected media file.

In some embodiments, a method of playing media files includes accessing a media library, identifying a plurality of media files in the media library, indexing metadata of the plurality of media files, targeting a first subset of media files in the plurality of media files based on metadata of a selected media file, and playing at least one media file of the first subset of media files.

In some embodiments, a method of playing media files includes accessing a media library, identifying a plurality of media files in the media library, indexing metadata of the plurality of media files, playing a first media file, selecting a metadata category, targeting a first subset of media files in the plurality of media files based on the selected metadata category and the metadata of the first media file while the first media file is playing, and playing at least one media file of the first subset of media files.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 6-1 is a front view of an electronic device with a plurality of targeting buttons, according to at least one embodiment of the present disclosure;

FIG. 6-2 schematically illustrates the targeting of metadata using the targeting buttons of FIG. 6-1, according to at least one embodiment of the present disclosure;

FIG. 7-1 illustrates a user input to modify a targeting button, according to at least one embodiment of the present disclosure;

FIG. 7-2 schematically illustrates the targeting of metadata using the targeting button and threshold value of the user input of FIG. 7-1, according to at least one embodiment of the present disclosure;

FIG. 7-3 schematically illustrates the simultaneous targeting of a plurality of metadata categories, according to at least one embodiment of the present disclosure.

DETAILED DESCRIPTION

This disclosure generally relates to electronic devices and methods of use. More particularly, this disclosure generally relates to computing devices and other electronic devices that play media files. For example, the present disclosure can relate to a portable electronic device that can play audio media files. In some instances, the media files may include .mp3, .mp4, .mov, .mpeg, and other related formats. In some embodiments, an electronic device according to the present disclosure may target, sort, filter, or otherwise select media files to play or present to a user based on a selected or currently playing media file.

Figure 1:
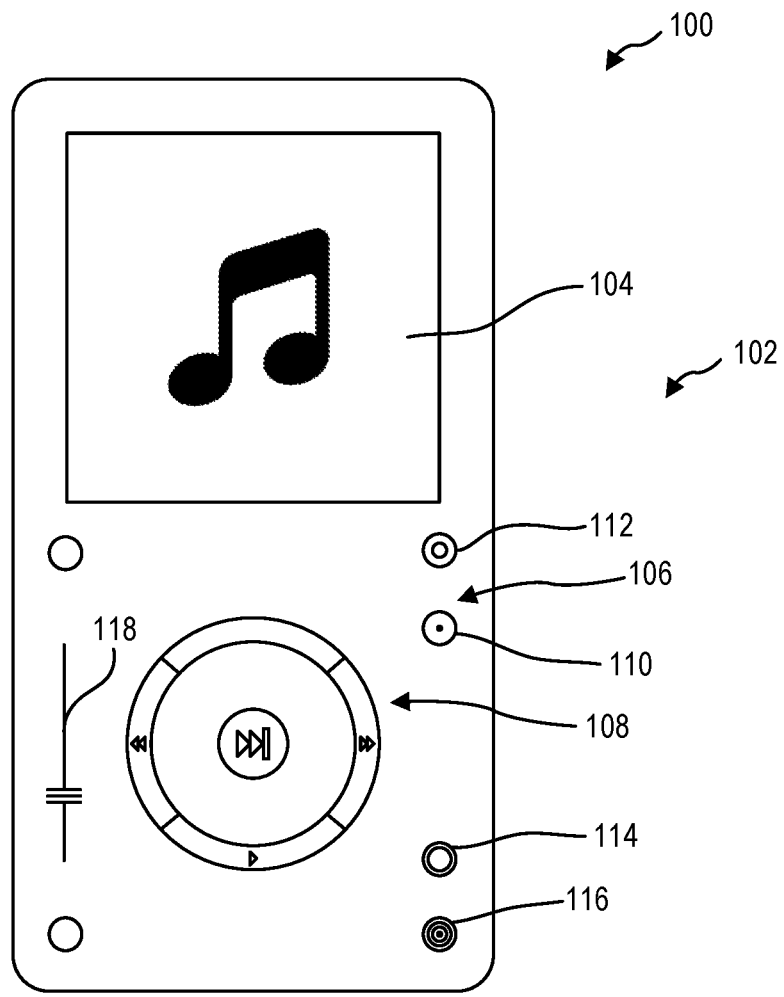
FIG. 1 is a front view of an electronic device with a user interface, according to at least one embodiment of the present disclosure.

FIG. 1 is an embodiment of an electronic device 100 and a user interface 102 for targeting and playing media files. The electronic device 100 has a processor 101 and a hardware storage device 103 in communication with the processor 101. The hardware storage device 103 can include platen-based storage, solid-state storage, or other long-term non-transitory data storage. The hardware storage device 103 can stored instructions that, when executed by the processor 101, cause the electronic device 100 to perform any of the methods described herein.

The electronic device 100 can have a user interface 102 that presents information to a user with a display 104. The electronic device 100 has one or more input devices 106 with media control buttons 108 and at least one targeting button 110, 112, 114, 116. The media control buttons 108 include the conventional control buttons including play, pause, stop, forward, rewind, seek forward, seek backward, or other media playback controls. The media control buttons may allow for additional functionality, such as repeat, scan, or other additional controls that allow for the selection or control of playback from a playlist, a channel, or other conventional queue of media files from a media library.

In some embodiments, one or more targeting buttons 110, 112, 114, 116 can allow a user to quickly and easily target media files within a media library by relating metadata of a selected media file with the metadata of other media files in the media library. For example, the selected media file may be a currently playing media file, such as shown on the display 104 and/or is played on speakers, earphones, or other audio devices connected to or in communication with the electronic device 100. A user can, therefore, target additional media files if the user wants to watch or listen to media similar to the currently playing media file.

For example, users may listen to music during exercise. When a song is played that features an artist the user would like to listen to more, the user can target media files with artist name metadata that matches the currently playing media file. In other examples, the currently playing media file may have a tempo or speed (beats per minute) that matches the user's current exercise cadence. For example, when cycling, a rider conventionally maintains a pedal cadence of approximately 90 revolutions per minute. In such an example, a user may want to listen to music with approximately 90 beats per minute (BPM) to match their pedal cadence and help them maintain a constant pace. The user interface 102 may have a threshold control 118 that allows a user to set a threshold value. The targeting may use the threshold value to target files with metadata within the threshold value of the selected media file.

The targeting buttons 110, 112, 114, 116 may include an album name targeting button 110, an artist name targeting button 112, a genre targeting button 114, a media library targeting button 116, or other buttons. In the user interface 102 illustrated in FIG. 1, the targeting buttons are presented as bullseye shapes of increasing specificity. For example, the album name targeting button 110 is a circle with a single dot at the center, conveying the highest level of specificity for when a user desires to target only media files from the currently selected album. The artist name targeting button 112 is a circle with a small circle concentric to the center point of the album name targeting button 110, and the artist name targeting button 112 conveys a broader targeting than the album name targeting button 110. The genre targeting button 114 is a circle with a larger circle concentric to the small circle of the artist name targeting button 112, and the genre targeting button 114 conveys a broader targeting than the artist name targeting button 112. Finally, the media library targeting button 116 shows all of the concentric circles and point of the other targeting buttons, indicating targeting the full scope of the media library.

Figure 2:
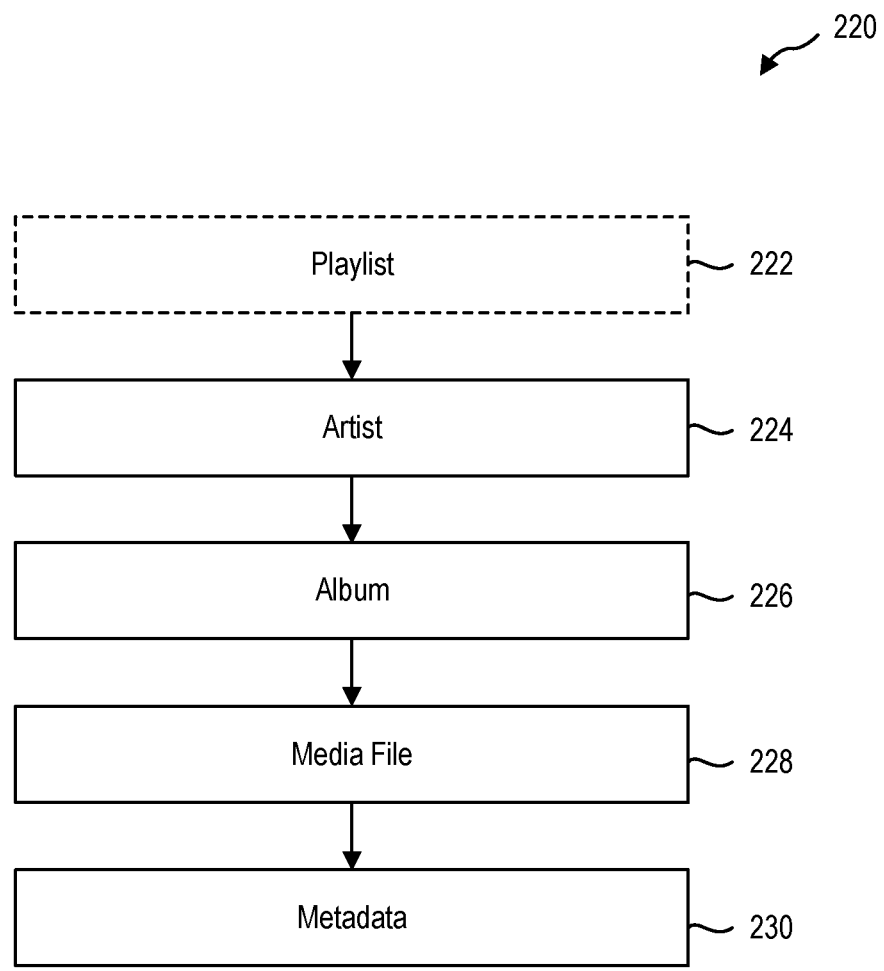
FIG. 2 is a conventional file hierarchy for a media library.

Targeting of media files allows a user to identify and queue media files that are similar to or otherwise share metadata with the selected media file in a dynamic fashion. The targeting may allow the user to customize the media files dynamically based on user preferences as media files are played. In a conventional media player, media files are arranged in a file system hierarchy that organizes the media files in the media library. The playback of the media files is conventionally hindered by the file hierarchy, however. FIG. 2 illustrates a conventional media file storage hierarchy 220. For clarity, the media files will be described in relation to music files, while in other embodiments, the media files may be movie files, chapter files, other audio files, or other media formats.

Media files can be manually associated with predetermined playlists 222 by the user or by another service. With a playlist, the media files are organized by a user. Within a media playlist or in the storage hierarchy, the media files are conventionally organized first by artist folders 224. Within a given artist folder 224, the media files are conventionally further organized by album folder 226. The media file 228 itself is then located in the album folder 226. The media file 228 then has metadata 230 associated with the media file 228. Conventional media playback is organized by selecting media files 228 based upon their file folder location in the storage hierarchy 220 and not based upon the metadata 230 or other characteristics of the actual media file 228.

Figure 3:
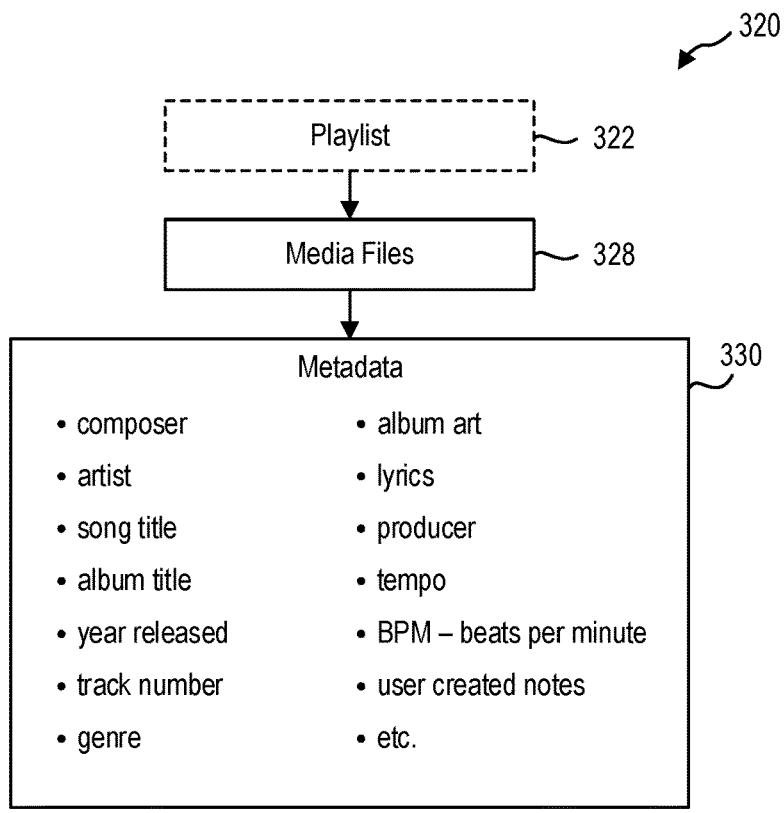
FIG. 3 is a file hierarchy for a media library, according to at least one embodiment of the present disclosure.

FIG. 3 illustrates a storage hierarchy 320 according to the present disclosure. The media files 328 may, again, be associated with a playlist 322. The storage hierarchy 320 becomes a flat hierarchy in which all of the media files 328 within a media library are indexed by the metadata 330 irrespective of the storage structure. The standard metadata 330 for music media files includes composer, artist, song title, album title, release or publication year, track number on the album, genre, album art, lyrics, producer, temp, BPM, user created notes, or other metadata provided by the publisher or user.

The organizational structure of the media library can, therefore, be ignored and the electronic device can utilize the metadata 330 to target specific media files. This is important as media libraries utilized by users migrate more and more to remote storage or subscription services, such as Apple Music, Amazon Music, or Groove Music. A media player according to the present disclosure may allow users more specific and customized control over the playback and selection of a media library.

In a first example, a user may want to listen to music featuring a particular artist. In a conventional system, the user may select the artist folder containing music of that artist and play music stored therein. However, other media files may feature that artist without being stored in that location. For example, that artist may be featured on a song published under the name of another artist. The user will not find that media file in the artist folder, but the artist name may be included in the metadata 330.

Figure 4:
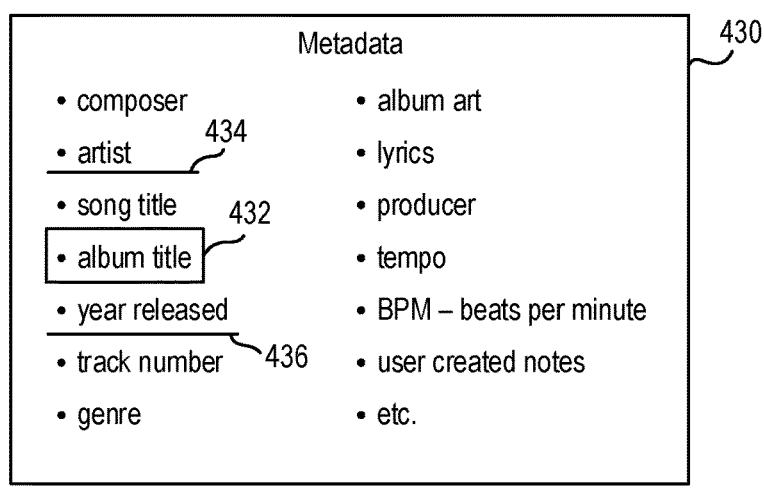
FIG. 4 is a set of associated metadata, according to at least one embodiment of the present disclosure.

Further, targeting based on metadata allows for simplified selection of music or other media files during playback from the currently playing media file display and via one or more categories of metadata. For example, FIG. 4 illustrates an example of targeting of a selected media file using the album title. In some embodiments, the album title may be common to multiple albums and multiple artists. For example, when listening to a music file from the "Greatest Hits" album of an artist, a user may want to target only music from that album. Conventional search methodologies for "Greatest Hits" in the album name field of a media player would return all music from any "Greatest Hits" album of any artist in the media library. Targeting the metadata 430, however, allows for targeting based on a plurality of categories in a dynamic fashion.

When targeting based on album title, the system may additionally target associated categories of metadata to ensure the media player presents to the user only the media files intended. When a user targets based on album title, the user is indicating a desire to watch or hear media files from that particular album and not any album by that name. In at least one example, when a user presses an album targeting button (such as the album name targeting button 110 described in relation to FIG. 1), the album title metadata category 432 can be targeted and associated metadata are additionally targeting automatically. To ensure the album title metadata targeting returns only the intended album media files, targeting of the album title metadata category 432 can automatically include targeting the artist metadata category 434. This may ensure that a "Greatest Hits" album title returns only such albums for the currently selected artist. In some embodiments, targeting of the album title metadata category 432 can automatically include targeting the publication year and/or year released metadata category 436. Some artists can have multiple "Greatest Hits" albums over the course of their career or after their career and such albums released in different years may have different content.

Figure 5:
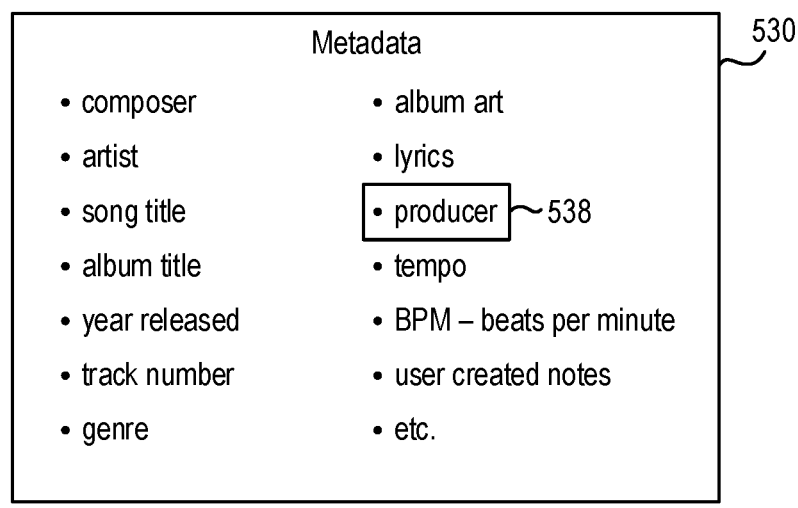
FIG. 5 is a set of targetable metadata, according to at least one embodiment of the present disclosure.

FIG. 5 illustrates another embodiment of targeting via metadata 530. Playing media files according to the targeting method described herein allows for users to find and enjoy media files similar to a selected media file without a need to know the details of the currently selected media file. For example, a user will commonly know the artist or even the album of a currently playing music file. However, fewer users will be familiar with the details of the producer, publishing label, composer, or other less commonly marketed or discussed details of the music.

A user can target the producer metadata category 538 easily from the user interface (such as a user interface 102 described in relation to FIG. 1) to target media files within the media library that share the producer with the currently selected media file. In the music industry, a producer may produce music within a single genre or a set of related genres, with similar artists, or in a similar style or subject matter. Some producers have garnered sufficient appreciation that their music has approached a status of having their own genres, such as Karl Martin Sandberg input device and/or (professionally known as Max Martin) in pop music or Andre Romelle Young (professionally known as Dr. Dre) in hip hop music. If a user is enjoying a song or album produced by an individual, the user may find that they would enjoy other music by that same producer. Targeting the producer metadata category 538, therefore, may allow a user to target and enjoy stylistically similar music without constraining a playlist to a particular artist, album, era of music, or genre.

Figures 1, 6:
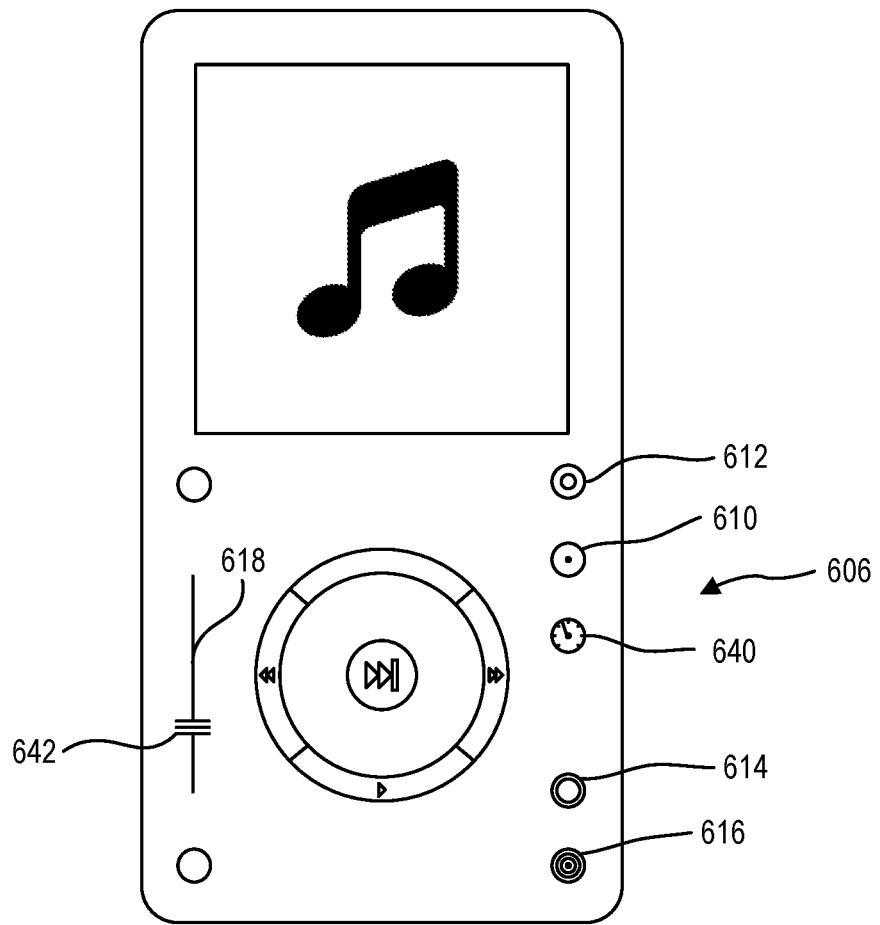
Figures 2, 6:
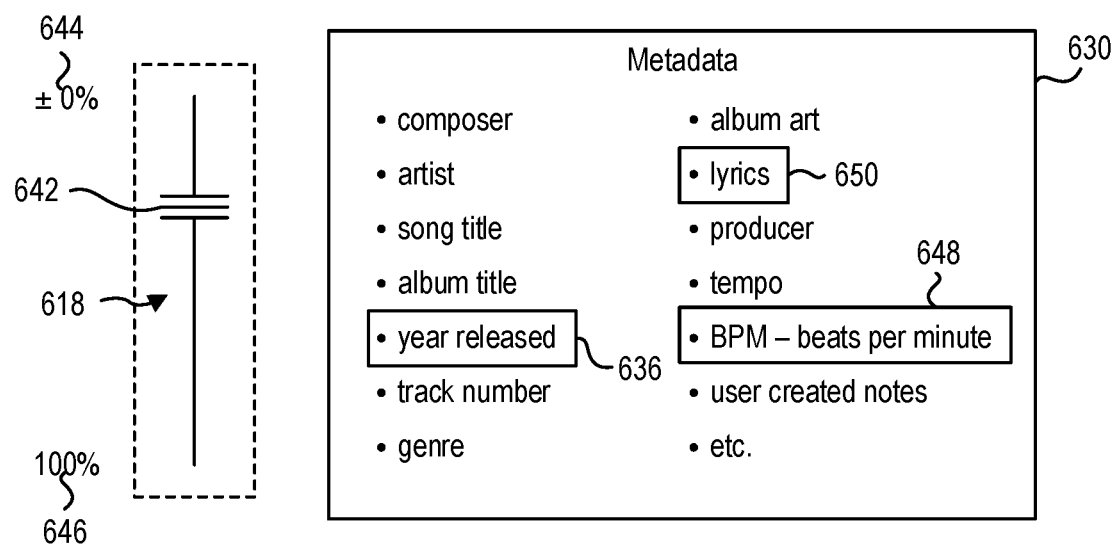

Referring now to FIG. 6-1 and FIG. 6-2, targeting of metadata can include the selection and/or use of a threshold value to set a range of metadata values. For example, any quantified value in the metadata may be targeted for an exact match, such as the year of publication. Additionally, any quantified value in the metadata may be targeted within a range of the selected media file. For example, the user may target any media files published within two years of the selected media file.

As described previously, in some embodiments, a user may desire to target music files based upon a tempo or BPM for exercise purposes. FIG. 6-1 illustrates an example user interface 606 including a plurality of targeting buttons 610, 612, 614, 616, 640 and a threshold control 618. In addition to the targeting buttons described in relation to FIG. 1, the user interface 606 includes a BPM targeting button 640 to target media files within the media library based on the BPM metadata category.

Selection of the BPM targeting button 640 may activate the threshold control 618. In some embodiments, the threshold control 618 is inactive or "greyed out" until a relevant targeting button is selected. In other embodiments, the threshold control 618 is only present in the user interface 606 when a relevant targeting button is selected. In yet other embodiments, the threshold control 618 is presented to the user, but the threshold value selected by the threshold control 618 is only considered by the system during targeting of a relevant metadata category.

In some embodiments, the threshold control 618 has a slider 642 or dial that is moveable to select a threshold value. In other embodiments, the threshold control 618 is an input field into which a user may directly input or select a threshold value. In yet other embodiments, the threshold control 618 has a plurality of discrete states, such as low, medium, and high that correspond to preset threshold values. In some examples, the threshold control 618 displays the threshold value. In other examples, the threshold control 618 indicates the relative threshold value by the location of the slider 642.

FIG. 6-2 illustrates an example effect of the threshold control 618 on targeting of media library metadata 630. The threshold control 618 may have a slider 642 that is movable between a minimum value 644 and a maximum value 646. In some embodiments, the minimum value 644 and maximum value 646 are percentages used to place a range of values for the metadata targeting. For example, the minimum value 644 and maximum value 646 may be 0% and 100%, respectively. Moving the slider 642 to the minimum value 644 will set the threshold value to 0%, allowing 0% variation from the selected media file metadata. For example, a threshold value of 0% variation when the BPM metadata category 648 is selected results in targeting of the BPM metadata category 648 at the exact value of the BPM of the selected media file. In another example, such as the bicyclist cadence described herein, a 10% threshold value for a media file with 90 BPM results in a targeting range of 81 BPM to 99 BPM, playing only media files with a similar cadence and keeping the cyclist on pace.

In other embodiments, the minimum value 644 and maximum value 646 are nominal values based on the metadata category selected. For example, a percentage range may be less useful when targeting media files based on the year released. In such examples, the minimum value 644 and maximum value 646 may be 0 and 30, allowing a maximum range of 60 years centered on the selected media file release year. For example, a threshold value of five years may target media files released within the decade around the selected media file. In at least one example, a threshold value of five years for the year released metadata category 636 of a media file with a 1995 release year results in targeting media files released from 1990 to 2000. In at least another example, a threshold value of three years for the year released metadata category 636 of a newly released media file results in targeting media files released in the previous three years.

In yet other embodiments, a threshold control 618 may allow for the targeting of a lyrics metadata category 650. For example, the lyrics of media files within the media library may be identified within the metadata 630 and compared against one another. The threshold control 618 may set a threshold value of lyrics shared between media files. For example, targeting the lyrics metadata category 650 with a threshold value of 50% targets media files with lyrics that match by at least 50%. Such targeting may allow a user to target and play media files that are covers or other performances of the same music, even if published by a different artist, under a different song title, or in a different genre. In other examples, targeting the lyrics metadata category 650 with a threshold value of 10% may return media files on which portions of the song are sampled, such as "Try a Little Tenderness" performed by Otis Redding being sampled on "Otis" performed by Kanye West and Jay-Z.

Figures 1, 7:
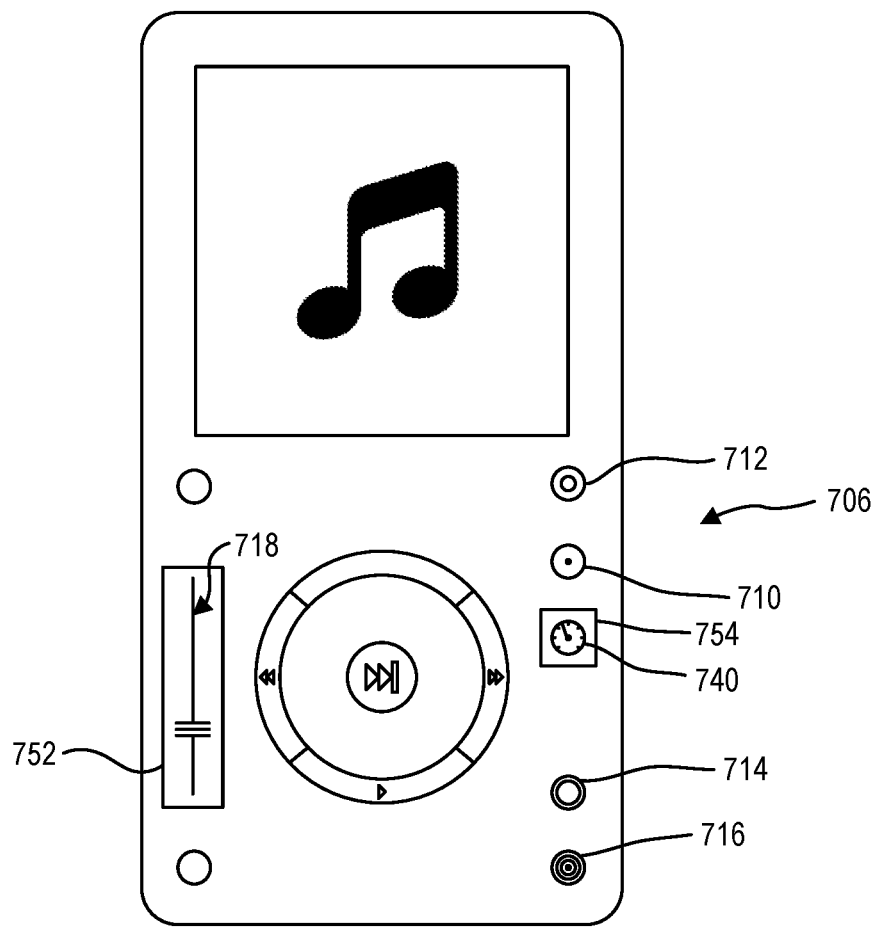
Figures 2, 7:
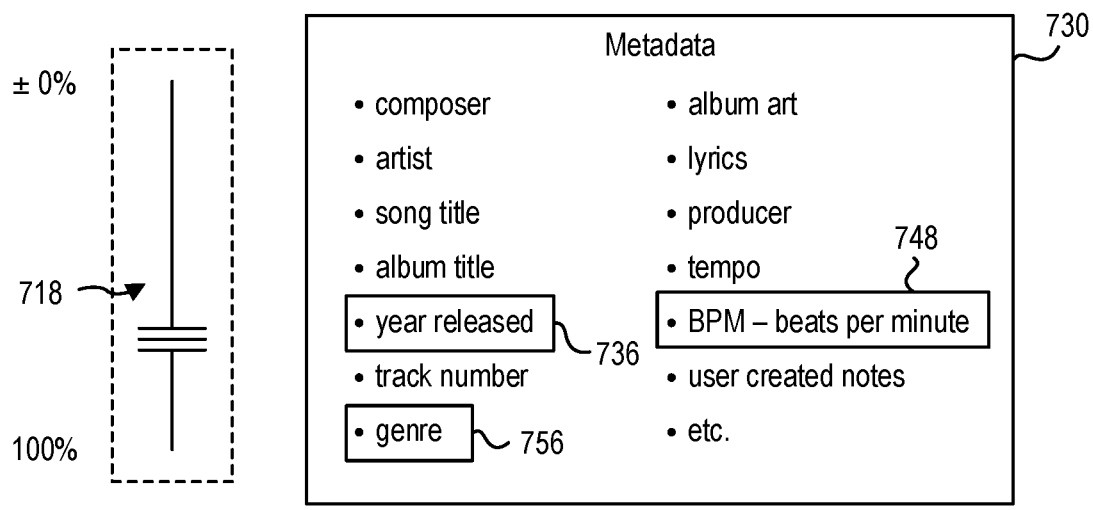
Figures 3, 7:
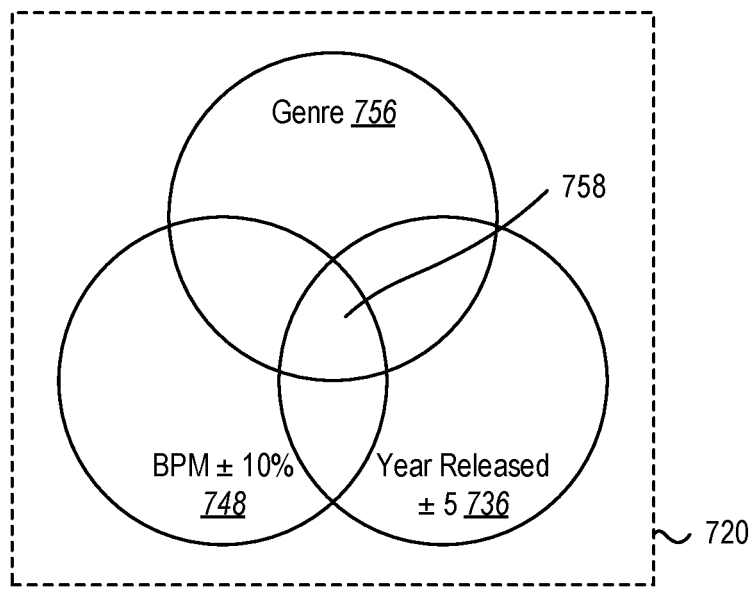

Targeting of metadata categories can be used in combinations, allowing for refined targeting of media files. FIG. 7-1 and FIG. 7-2 illustrate an embodiment of using a plurality of metadata categories to target and play media files the user intends. FIG. 7-1 illustrates a user interface 706 similar to that described in relation to FIG. 6-1. The user interface 706 has a plurality of targeting buttons 710, 712, 714, 716, 740 and a threshold control 718. The targeting buttons 710, 712, 714, 716, 740 can be used in combination to target more than one metadata category simultaneously. The threshold control 718 may become active when a relevant targeting button and/or metadata category is selected. In the event that multiple relevant targeting buttons and/or metadata categories are selected the targeting button currently associated with the threshold control (and threshold value) may be indicated. For example, the user interface 706 may include a threshold control frame 752 displayed around the threshold control 718 and a targeting button frame 754 displayed around the associated targeting button, such as the BPM targeting button 740. In other examples, the color of the threshold control 718 and targeting buttons may change to indicate the associated metadata category.

Referring now to FIG. 7-2, the media library metadata 730 may be targeted via the year released metadata category 736, the BPM metadata category 748, and the genre metadata category 756. Both the year released metadata category 736 and the BPM metadata category 748 may be targeted in a range using the threshold control 718. By associating the state of the threshold control 718 independently with the year released metadata category 736 and the BPM metadata category 748, the targeting may provide the desired results.

FIG. 7-3 schematically illustrates the effect of the metadata targeting described in FIG. 7-2. For example, the media library has media files 720 with metadata, and the media files 720 contain subsets corresponding to the targeted year released metadata category 736, the BPM metadata category 748, and the genre metadata category 756. The year released metadata category 736 has a threshold value of five years associated with that metadata targeting, the BPM metadata category 748 has a threshold value of 10% associated with that metadata targeting, and the genre metadata category 756 is targeting the subset of media files that matches the genre exactly. The resulting overlap 758 in the subsets provides the desired results to the user. The system targets and plays media files that were released within 5 years of the selected track, have a BPM within 10% variation of the selected track, and share the genre of the selected track.

Figure 8:
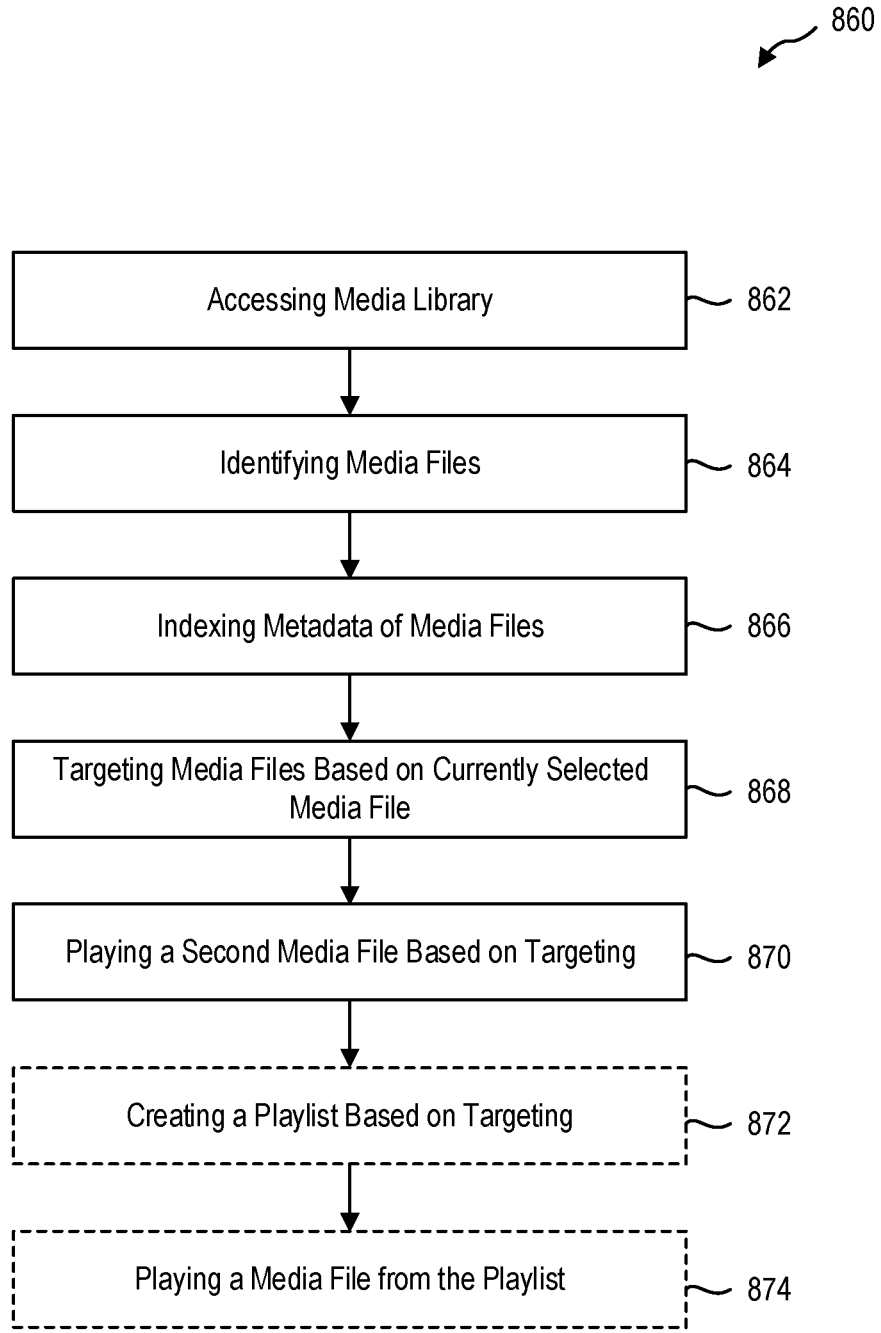
FIG. 8 is a flowchart illustrating a method of playing media files, according to at least one embodiment of the present disclosure.

An example method 860 according to the present disclosure is illustrated in the flowchart of FIG. 8. The method 860 includes accessing a media library having a plurality of media files at 862. In some embodiments, the media library is a locally stored media library, such as on a portable music device, on a laptop or desktop computing device, or in a home theater system. In other embodiments, the media library is a remotely stored media library, such as a streaming service or a cloud-based storage system, and the electronic device includes a communication device to access the remotely stored media library.

The method 860 further includes identifying media files in the media library at 864 and indexing the metadata of the media files at 866. Identifying the media files and indexing the metadata of the media files allows the system to parse the metadata, which may have different formats between media files, and create categories of the metadata in advance of targeting. Indexing may allow the system to target the files more efficiently than searching the metadata in whole each time. In other embodiments, such as locally stored or smaller media libraries that may be searched more rapidly, indexing may have less time savings and be less important.

The method 860 includes targeting a subset of media files based on the currently selected media file at 868. In some embodiments, the currently selected media file is the currently playing media file. In other embodiments, the currently selected media file is a media file selected by the user from which a subset of media files may be targeted, without playing the media file. This may be done, for example, when a user desires to change the type of music she is listening to, but does not yet want to end a currently playing song.

The targeting can be performed by one or more targeting buttons on the user interface. In some embodiments, the user interface has a plurality of targeting buttons that each have a selected and unselected state, to toggle on and off targeting of that metadata category. In other embodiments, the user interface has a first targeting button that targets a first category of metadata and at least one soft button that targets a second category of metadata when the first targeting button is deselected and a third category of metadata when the first targeting button is selected. In yet other embodiments, the user interface has at least one multi-state soft button that changes the targeted metadata category with each instance of the user selecting the multi-state soft button. For example, the multi-state soft button may be inactive and/or representing the full media library in a first state, indicating no targeting of metadata categories; active and representing targeting of the album name metadata category in a second state; active and representing targeting of the artist name metadata category in a third state; active and representing targeting of the genre name metadata category in a fourth state; and inactive when selected a fourth time.

The method 860 further includes playing a second media file based on the targeting at 870. The method 860 allows a user to, thereby, select a media file, target a subset of other media files in the media library, and then play a second media file from that subset to the user without the user needing to manually select another artist, album, or song from a conventional library hierarchy.

Additionally, the method 860 may optionally include creating a playlist based on targeting at 872 and playing a media file from the playlist at 874. In some embodiments, targeting of a subset of media files based on metadata of a selected media file may provide a random selection of media files that are within the subset matching the targeted metadata category. This may be advantageous when a user desires to play media files similar to the selected media file, without a particular media file or files in mind. In other embodiments, targeting of the subset may include creating and presenting to the user a playlist, from which the user may select and/or play particular media files. This may be advantageous if a user is trying to find a specific media file similar to the selected media file, but is unable to remember the details of the desired media file.

In either instance, targeting of metadata based on a selected media file allows for quick, simple, and robust organization and selection of related media files within a media library. A user interface, such as any of the embodiments described herein, allows for a variety of metadata targeting techniques to be employed intuitively, simplifying a user's experience with ever-growing digital media libraries.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. An electronic device for playback of media, the device comprising:
   a touch-sensitive display input device;
   a processor in communication with the touch-sensitive display input device; and
   a hardware storage device in communication with the processor, the hardware storage device having instructions stored thereon that, when executed by the processor, cause the processor to:
   access a media library containing a plurality of media files;
   access metadata of the plurality of media files in the media library wherein the metadata contains a plurality of metadata categories;
   identify metadata of a currently playing media file;
   present a user interface with audio control buttons on the touch-sensitive display input device, the audio control buttons including at least one two targeting buttons associated with a metadata category; and
   in response to receiving a first input from a first targeting button, target a first subset of the plurality of media files having metadata matching or within a threshold value of the metadata of the selected media file in a first metadata category; and
   in response to receiving a second input from a second targeting button, target a second subset of the plurality of media files having metadata matching or within a threshold value of the metadata of the selected media file in a second metadata category; and
   playing a second media file that is in both the first subset and the second subset.

2. The device of claim 1, the first targeting button being a soft button.

3. The device of claim 1, the user interface including a threshold control that sets the threshold value.

4. The device of claim 1, the first targeting button having a plurality of states, each state of the plurality of states targeting a different metadata category of the metadata of the selected media file.

5. The device of claim 1, wherein selecting the first targeting button changes the second metadata category associated with the second targeting button.

6. The device of claim 5, wherein the second metadata category changes upon depressing the first targeting button.

7. The device of claim 1 further comprising a communication device configured to access the media library.

8. The device of claim 1, wherein the media library is stored on the hardware storage device.

9. A method of playing media files, the method comprising:
   accessing a media library;
   identifying a plurality of media files currently available to play to a user in the media library;
   indexing metadata of the plurality of media files;
   receiving an input from a first targeting button of a user interface associated with a first metadata category of the metadata of the plurality of media files;
   targeting a first subset of media files in the plurality of media files based on metadata of a currently playing media file;
   receiving an input from a second targeting button of a user interface associated with a second metadata category of the metadata of the plurality of media files;
   targeting a second subset of media files in the plurality of media files based on metadata of the currently playing media file; and playing at least one media file of the plurality of media files that is included in both the first subset of media files and second subset of media files.

10. The method of claim 9, further comprising creating playlist based on the first subset and second subset of media files.

11. The method of claim 9, targeting a second subset including automatically targeting the second subset in response to targeting the first subset.

12. The method of claim 9, the metadata comprising an artist title, an album title, and a publication year.

13. The method of claim 12, the metadata further comprising a genre.

14. The method of claim 12, the metadata further comprising a beats per minute value.

15. The method of claim 12, the metadata further comprising a composer.

16. The method of claim 9, further comprising targeting the first subset based on a threshold value and the metadata of the currently playing media file.

17. The method of claim 9, further comprising targeting the second subset based on a second threshold value and the metadata of the selected media file.

18. A method of playing media files, the method comprising:
accessing a media library;
identifying a plurality of media files in the media library;
indexing metadata of the plurality of media files;
playing a first media file;
receiving an input from a first targeting button of a user interface associated with a first metadata category;
selecting the first metadata category of the first media file;
receiving an input from a second targeting button of the user interface associated with a second metadata category;
targeting a first subset of media files in the plurality of media files based on both the selected first metadata category and the second metadata category and the metadata of the first media file while the first media file is playing; and
playing at least one media file of the first subset of media files.

19. The method of claim 18, targeting the first subset including targeting media files within a threshold value of the metadata of the first media file while the first media file is playing.

20. The method of claim 18, targeting a first subset of media files in the plurality of media files includes creating the first subset including only media files that match the metadata of the first media file in both the first metadata category and the second metadata category.

* * * * *